July 30, 1935.  J. NORTHROP  2,009,901
FILLING CUTTER
Filed July 12, 1934  2 Sheets-Sheet 2
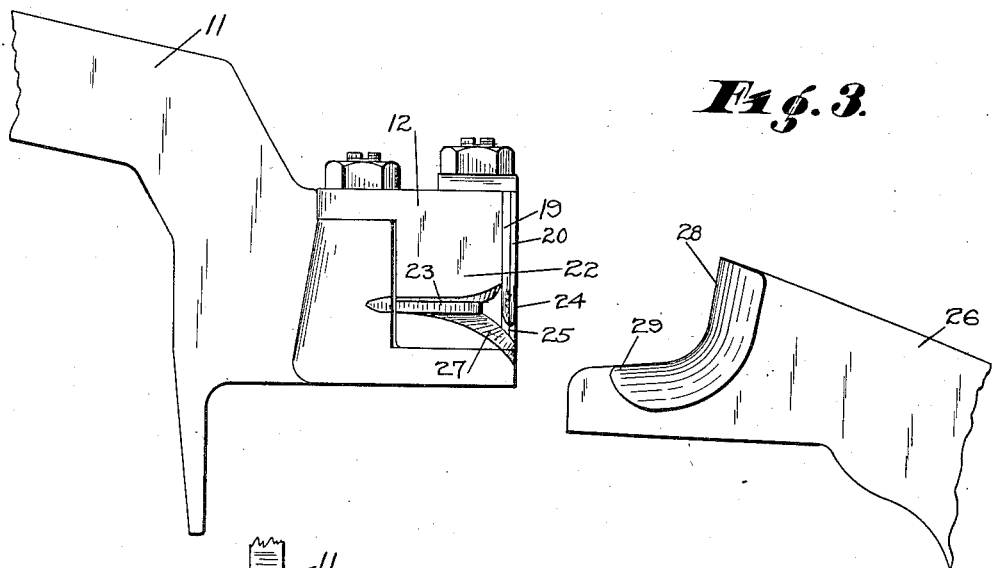
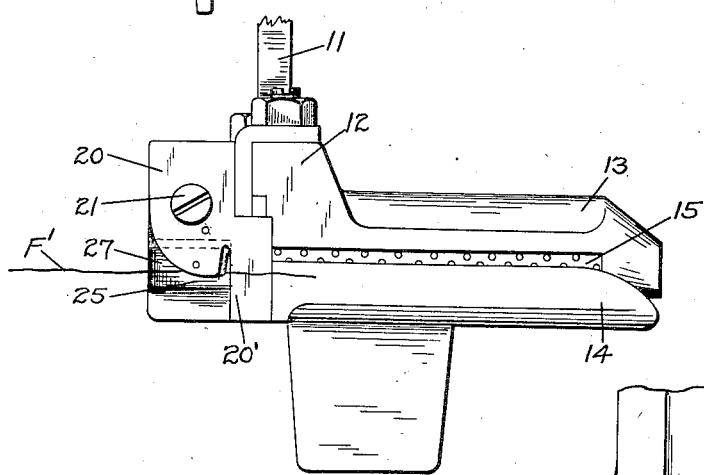
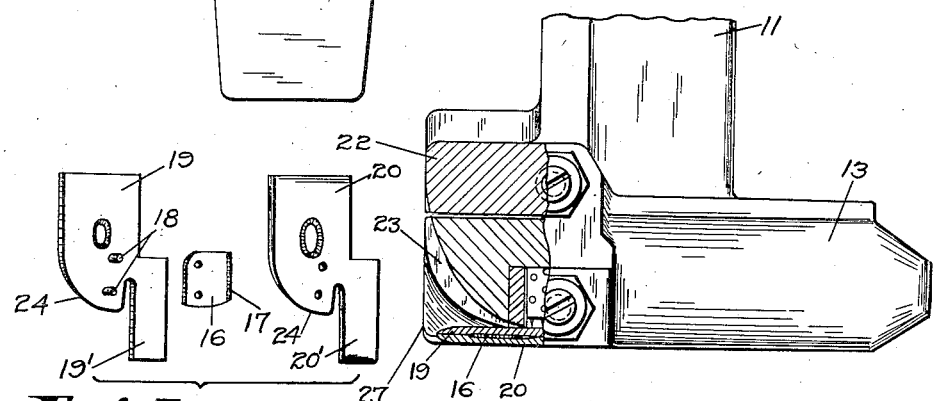
WITNESS.
CLINTON S. COBURN.
INVENTOR.
JONAS NORTHROP.
BY Claude F. Snider
ATTORNEY.

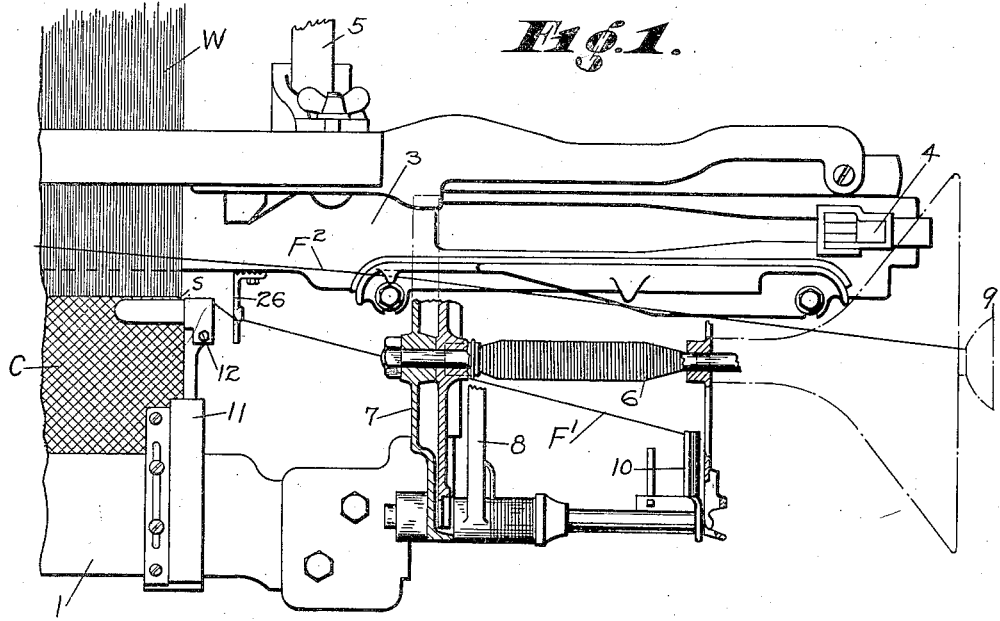
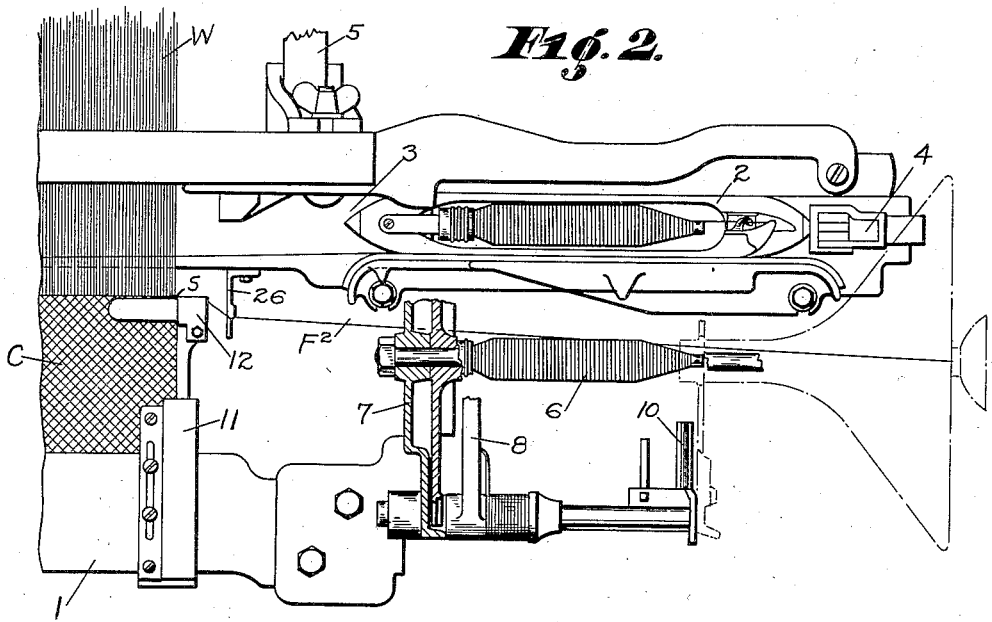

Patented July 30, 1935

2,009,901

UNITED STATES PATENT OFFICE 2,009,901

FILLING CUTTER

Jonas Northrop, Hopedale, Mass., assignor to Draper Corporation, Hopedale, Mass., a corporation of Maine Application July 12, 1934, Serial No. 734,855

9 Claims. (Cl. 139—258)

The present invention pertains to filling replenishing looms, and has more particular reference to means for cutting filling ends, such as those ends incidentally left by the replenishing operation.

The conventional filling replenishing looms have means at one side thereof for automatically supplying a fresh shuttle or bobbin when the filling supply in the running shuttle is substantially exhausted. The replenishing operation usually leaves a so-called outgoing filling end projecting from the cloth selvage, and also leaves a so-called incoming filling end extending between the replenishing mechanism and the newly inserted filling supply. This latter end, after the beating in of the first pick, also projects from the selvage, and it is to the trimming of these ends adjacent the selvage that my invention is particularly directed.

Prior devices for cutting such filling ends have left much to be desired. It is particularly noted that the continuously operating cutting devices wear out too rapidly, and require too much sharpening and adjusting, while the intermittently operating devices are generally too intricate to be acceptable. Attempts have been made to cut the filling ends by means of fixed knives or the like, but, insofar as I am aware, none of such attempts have been successful, and no such device has gone into commercial use.

Accordingly, it is a principal object of my invention to provide, in a filling replenishing loom, a practical and efficient filling end cutting means which, preferably, does not have any moving parts and which, in consequence thereof, is comparatively trouble free and permanent.

To the end mentioned, I have devised a thread cutting means comprised of a fixed cutting blade mounted on the loom temple and lying in the plane of the rear face thereof and a fixed member on the lay constructed and operating to present the filling ends to the cutting blade for cutting by the latter, the cutting being accomplished by moving the threads against and along the cutting edge of the blade.

Further objects of my invention will, in part, be hereinafter more specifically enumerated, or will become obvious as the description proceeds.

The preferred embodiment of my invention is illustrated on the accompanying drawings, of which:

Fig. 1 is a fragmentary plan, partly in section, showing the replenishing end of a loom as it appears the first beat-up of the lay after the replenishing operation;

Fig. 2 is a view similar to Fig. 1 but showing the second beat-up after the replenishing operation;

Fig. 3 is a fragmentary elevation, to a larger scale, of the temple and an associated part, of my invention, which parts appear on Fig. 1;

Fig. 4 is a rear elevation of the temple;

Fig. 5 is a perspective of certain parts of the thread cutter; and

Fig. 6 is a plan of the temple, the same being cut away to show the thread cutter.

The loom to which my invention has been applied has the usual breast beam 1 at the front thereof, and the warp threads W are fed forwardly toward the breast beam by suitable means, not shown. The filling is inserted in the shed by a shuttle 2 which is picked along the lay 3 by picker sticks, as 4, and the lay is reciprocated forwardly and rearwardly, toward and from the breast beam, as by pitman 5.

The particular loom shown is of the bobbin changing variety, extra bobbins 6 being held in a battery 7 and transferred to the shuttle at the desired time by means including a transferrer 8. The ends from the extra bobbins in the battery extend to and are held by a suitable thread holder 9. In the loom shown, the replenishing operation is accomplished while the lay is at front center, and without stopping the loom. Simultaneously with the replenishing operation, a thread cutter 10 cuts the outgoing filling end F' adjacent the outer, or eye end of the shuttle and pulls this end forwardly to the position shown in Fig. 1.

The picks of filling inserted by the shuttle are beaten in by a reed (not shown) on the lay, to form cloth C, and the cloth thus woven is kept taut by means of temples, of which the right hand temple is indicated generally at 11.

With the exception of certain features of the temple, all of the parts as thus far described are old and well-known in the art and should require no further description. Such parts are not of the present invention, except as they are illustrative of elements which may be used in conjunction with other elements, hereinafter disclosed, to constitute the combination defined in the appended claims.

The temple 11 includes a head 12 equipped with an inwardly extending cap 13, pod 14 and roll 15 all of usual construction except as the head is modified to accommodate my new thread cutting means. The thread cutter proper is herein constituted by a thin steel blade 16 sharpened along its inner edge 17. The blade 16 is fixed to the temple, preferably to the rear vertical face thereof in a plane parallel to the lay, with the cutting edge 17 facing inwardly of the loom (which is toward the cloth) and extending approximately vertically.

The thread cutter blade 16 may be removably fixed to the temple and to this end is provided with apertures to receive pins 18, 18 in a plate 19. The blade is positioned between the plate 19 and a cover plate 20, and the assembly held to the face of the temple by a screw 21. For reasons which will appear, the cutting edge of the blade 16 faces toward and forms an acute angle with a part of the temple, such as legs 19', 20' of the plates 19 and 20. It will be noted that in the present embodiment the apex of the angle thus formed is at the top of the angle, i. e. the sides of the angle diverge downwardly.

The angle between the cutting edge 17 and the part 19', or 20', should be calculated with regard to the approximate size of filling to be used. This angle should be such that when a filling thread or end is made to extend through the angular space and is then moved upwardly along the cutting edge it will become wedged between the aforesaid part and the cutting edge and cut by the latter. It is found to be unnecessary to form both "legs" of the angle as cutting edges, the single cutting edge 17, facing the blunt edges of parts 19', 20' being just as satisfactory.

The cutting edge 17 faces inwardly, away from the outer face 22 of the temple, as above noted. To permit access to the edge I have cut out the temple head as at 23 and rounded the plates 19, 20, as at 24, to provide a thread entrance 25 through which the threads may be moved to the cutting edge. I have devised, and herein disclose, specific means for moving the filling ends through the entrance 25 and against and along the cutting edge of the blade. It is here noted, however, that the temple and thread cutter are not limited to use with the specific thread moving means herein disclosed. Likewise, the thread cutter and temple may be modified, within the scope of the appended claims, regardless of the construction of the thread moving means with which they cooperate.

The aforementioned thread moving means is very simple, the only part added to the loom being a member 26 which is fixed to the lay and cooperates with guide surface 27 on the temple. The member 26 is fixed to the front of the lay outwardly of the temple, and projects upwardly and forwardly, between the temple and the replenishing mechanism. An upwardly extending surface 28 on the front of the member 26 acts as a pushing surface, to push threads forwardly to and past the thread cutter as the lay beats up. A forwardly extending surface 29 on the member serves to support the threads as they are carried forward.

The operation of the device is as follows:

At the time of filling replenishment the member 26 is forwardly of the path of the outgoing end, which extends from the selvage S, at the fell, to the cutter 10. The incoming end extends, at this time, from the battery to the shuttle, and accordingly both ends escape the action of the member 26. Then, as the lay recedes, the member 26 recedes with it and eventually assumes a position to the rear of the outgoing end F'. The shuttle is picked to the left along the lay while the latter is moving rearwardly, the pick of filling and the incoming end F² extending from the battery through the shed behind the member 26.

Fig. 1 illustrates the positions occupied by the outgoing and incoming filling ends as the lay beats up after the replenishing operation. The outgoing end F' is carried forwardly against the guide surface 27 on the temple. This surface extends from a point below the cutting blade upwardly and forwardly to cause the filling end to move through the entrance path 25 and upwardly into the angular space defined by the cutting edge 17. Continued forward movement of the lay from the position of Fig. 1 results in the filling end being carried farther forwardly and tightened against the cutting edge simultaneously with its movement upwardly along said edge. The filling end will be wedged and cut, as above described, appreciably before the lay reaches front center.

The beat-up of the lay just described serves to beat in the pick of filling to which incoming end F² is attached, so that thereafter said end extends from the selvage to the battery. Then, the lay recedes and carries the member 26 back of the end F², with the result that on the next beat-up this end will be carried forwardly and cut in the same manner as the previous end.

The member 26 is of sufficient height with respect to the lay that each filling end in its proper turn will bend upwardly and ride thereover as the lay recedes, the end snapping down to a position in front of the surface 28 before the lay begins its forward movement.

The advantages of the device of the present invention will be obvious. However, it may be particularly noted that since the device contains no wearing parts other than the small blade 16 it will last indefinitely with but negligible upkeep requirements. This same lack of wearing parts also means that, provided the cutting blade is sharpened or replaced occasionally, the device should operate continuously and without failure. The feature of selecting and carrying the filling ends forwardly to be cut one at a time after the replenishing operation may, of course, be utilized without utilizing all of the advantages of the specific embodiment of my invention herein disclosed, the true scope of the various aspects of my invention being defined in the appended claims.

I claim:

1. In a filling replenishing loom, the combination of the lay, filling replenishing mechanism, a temple, a fixed cutting blade carried by said temple and lying in a plane substantially parallel to the lay, and means including a member on the lay for causing cutting of the outgoing and incoming filling ends by carrying them against said cutting blade.

2. In a filling replenishing loom, the combination of the lay, filling replenishing mechanism, a temple, a fixed cutting blade carried by said temple, said cutting blade being fixed in a plane substantially parallel to the lay and having an approximately vertical cutting edge, and means for moving the outgoing and incoming filling ends against and along said cutting edge, thereby causing said ends to be cut.

3. In a filling replenishing loom, the combination of the lay, filling replenishing mechanism, a temple, a fixed cutting blade carried by said temple and lying substantially in the plane of the rear face of the latter substantially parallel to the lay, said cutting blade having a cutting edge in said plane, and cooperating means on the lay and temple for moving filling ends against and along said cutting edge, thereby causing said ends to be cut.

4. In a filling replenishing loom, the combination of the lay, filling replenishing mechanism, a temple having a cutting blade fixed to the rear face thereof in a plane parallel to the lay, the inner, vertical edge of said blade being sharpened to constitute a cutting edge, said temple being cut out to provide an entrance path leading from the outer face thereof to said cutting edge, and means operative after each replenishing operation to move the filling ends through said entrance path and against said cutting edge whereby said ends are cut adjacent the selvage.

5. In a filling replenishing loom, the combination of the lay, filling replenishing mechanism, a temple having a cutting blade fixed to the rear face thereof in a plane parallel to the lay, the inner, vertical edge of said blade being sharpened to constitute a cutting edge, said temple being cut out to provide an entrance path leading from the outer face thereof to said cutting edge, there being a guide surface on said temple extending from below said cutting blade upwardly and forwardly in such manner as to guide filling ends against and upwardly along said cutting edge, and means on the lay for pushing the filling ends against said guide surface.

6. In a loom, the combination of the lay, a temple having a fixed thread cutting blade, said blade lying in the plane of the rear face of said temple and having a cutting edge facing toward and forming an acute angle with a contiguous fixed part of the temple, and means for causing cutting of filling ends by moving them along said cutting edge toward the apex of said angle whereby they are wedged between said part and said edge and cut by the latter.

7. In a loom, the combination of the lay, a temple having a thread cutting blade fixed to the rear face thereof, said blade lying substantially in the plane of said face and having an approximately vertical cutting edge facing toward and forming an acute angle with a contiguous fixed part of the temple, and cooperating means on the lay and temple for cutting filling ends by moving them upwardly along said cutting edge toward the apex of said angle, whereby they are wedged between said part and said edge and cut by the latter.

8. In a filling replenishing loom, the combination of the lay, filling replenishing mechanism, a temple having a thread cutting blade fixed thereon and lying within a vertical plane parallel to the lay, said blade having a cutting edge facing toward and forming an acute angle with a contiguous fixed part of the temple, and cooperating means on the lay and temple for causing cutting of the outgoing and incoming filling ends during different but consecutive beat-ups of the lay after each replenishing operation, said means moving said ends against said cutting edge and along the same toward the apex of said angle whereby they are wedged between said part and said edge and cut by the latter.

9. In a filling replenishing loom, the combination of the lay, filling replenishing mechanism, a temple having a thread cutting blade fixed in the vertical plane of the rear face of the temple, said blade having an approximate vertical cutting edge facing toward and forming an acute angle with a contiguous fixed part of the temple, there being guide surfaces formed on said temple, and a member fixed to the lay for separately engaging the outgoing and incoming filling ends and carrying them forwardly during, respectively, the first and second beat-ups of the lay after each transferring operation, said member and said guide surfaces causing cutting of said ends by moving them against and along said cutting edge toward the apex of said angle whereby they are wedged between said part and said edge and cut by the latter.

JONAS NORTHROP.